United States Patent
Shin et al.

(10) Patent No.: US 8,692,662 B2
(45) Date of Patent: Apr. 8, 2014

(54) METHOD OF DETERMINING FAILURE OF ACTIVE AIR FLAP

(75) Inventors: Hee Sun Shin, Hwaseong-si (KR); Phil Jung Jeong, Yongin-si (KR); Jin Ho Kim, Suwon-si (KR); Yong Jin Jung, Seongnam-si (KR); Sang Won Park, Suwon-si (KR)

(73) Assignees: Hyundai Motor Company, Seoul (KR); Kia Motors Corp., Seoul (KR); Hyundai Mobis Co., Ltd., Seoul (KR)

( * ) Notice: Subject to any disclaimer, the term of this patent is extended or adjusted under 35 U.S.C. 154(b) by 82 days.

(21) Appl. No.: 13/538,306

(22) Filed: Jun. 29, 2012

(65) Prior Publication Data

US 2013/0147619 A1    Jun. 13, 2013

(30) Foreign Application Priority Data

Dec. 9, 2011    (KR) .......................... 10-2011-0131859

(51) Int. Cl.
*B60Q 1/00*    (2006.01)

(52) U.S. Cl.
USPC .................. 340/449; 180/68.1; 123/41.04

(58) Field of Classification Search
USPC .......... 340/449, 309.16; 180/68.1, 68.2, 68.4, 180/68.6; 123/41.01, 41.02, 41.04, 41.05; 454/68.4, 68.6, 69, 75
See application file for complete search history.

(56) References Cited

U.S. PATENT DOCUMENTS

| 8,118,124 B2 * | 2/2012 | Shin et al. ..................... 180/68.1 |
| 8,302,715 B2 * | 11/2012 | Lee et al. ..................... 180/68.1 |
| 2013/0146375 A1 * | 6/2013 | Lee .............................. 180/68.1 |

* cited by examiner

*Primary Examiner* — Hung T Nguyen
(74) *Attorney, Agent, or Firm* — Morgan, Lewis & Bockius LLP

(57) ABSTRACT

A method of determining a failure of an active air flap, including determining whether or not an active air flap is in a non-openable state, if the active air flap is in the non-openable state, continuously checking a variation of the temperature of engine-cooling water, and if the variation is below a reference variation, interrupting the generation of failure-alert, and if the variation of the temperature of engine-cooling water is above the reference variation, processing whether to generate the failure-alert such that if the time taken to reach the variation is above a reference temperature time, interrupting the generation of failure-alert, and if the time is below the reference temperature time, generating the failure-alert.

9 Claims, 4 Drawing Sheets

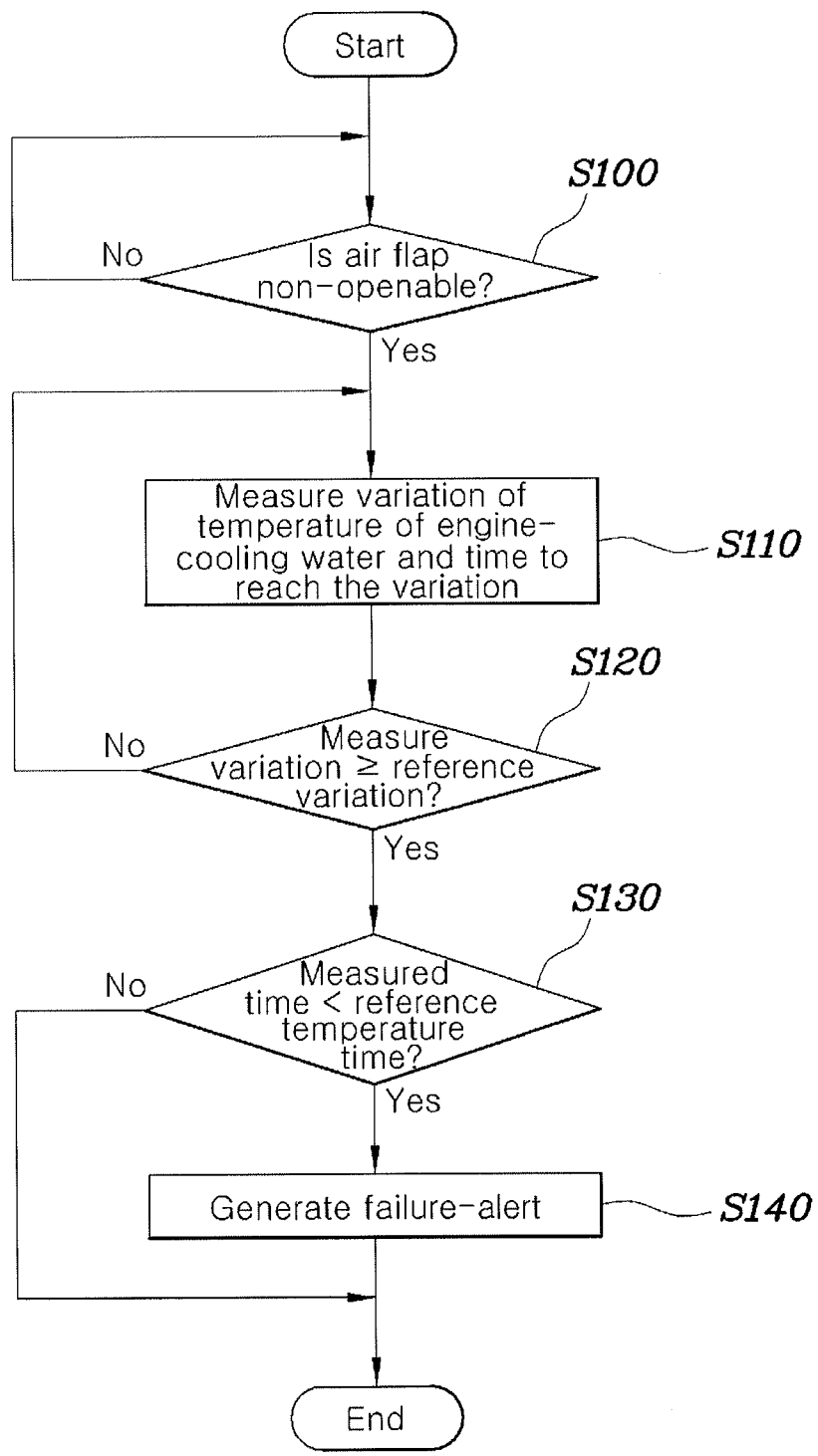

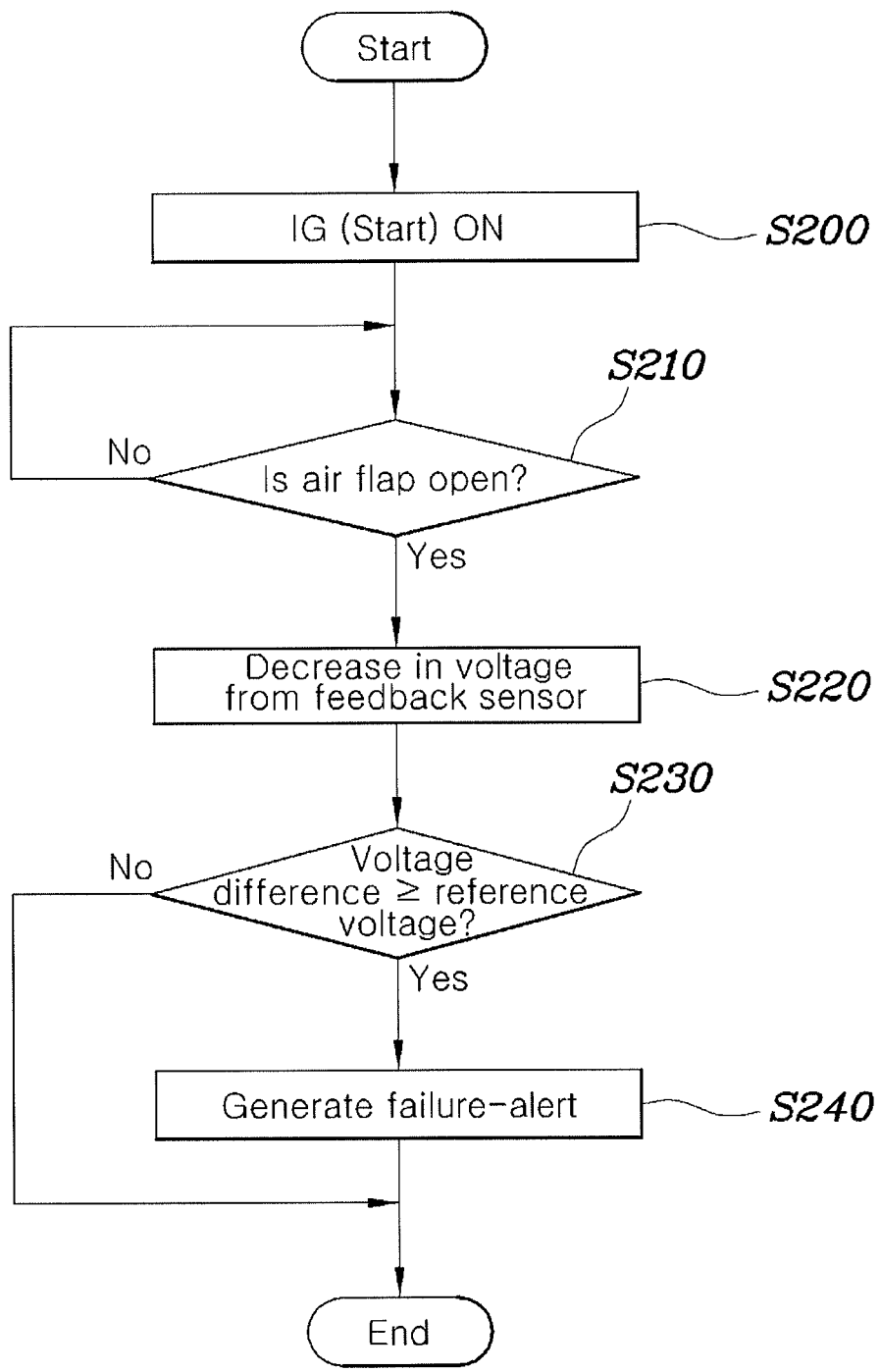

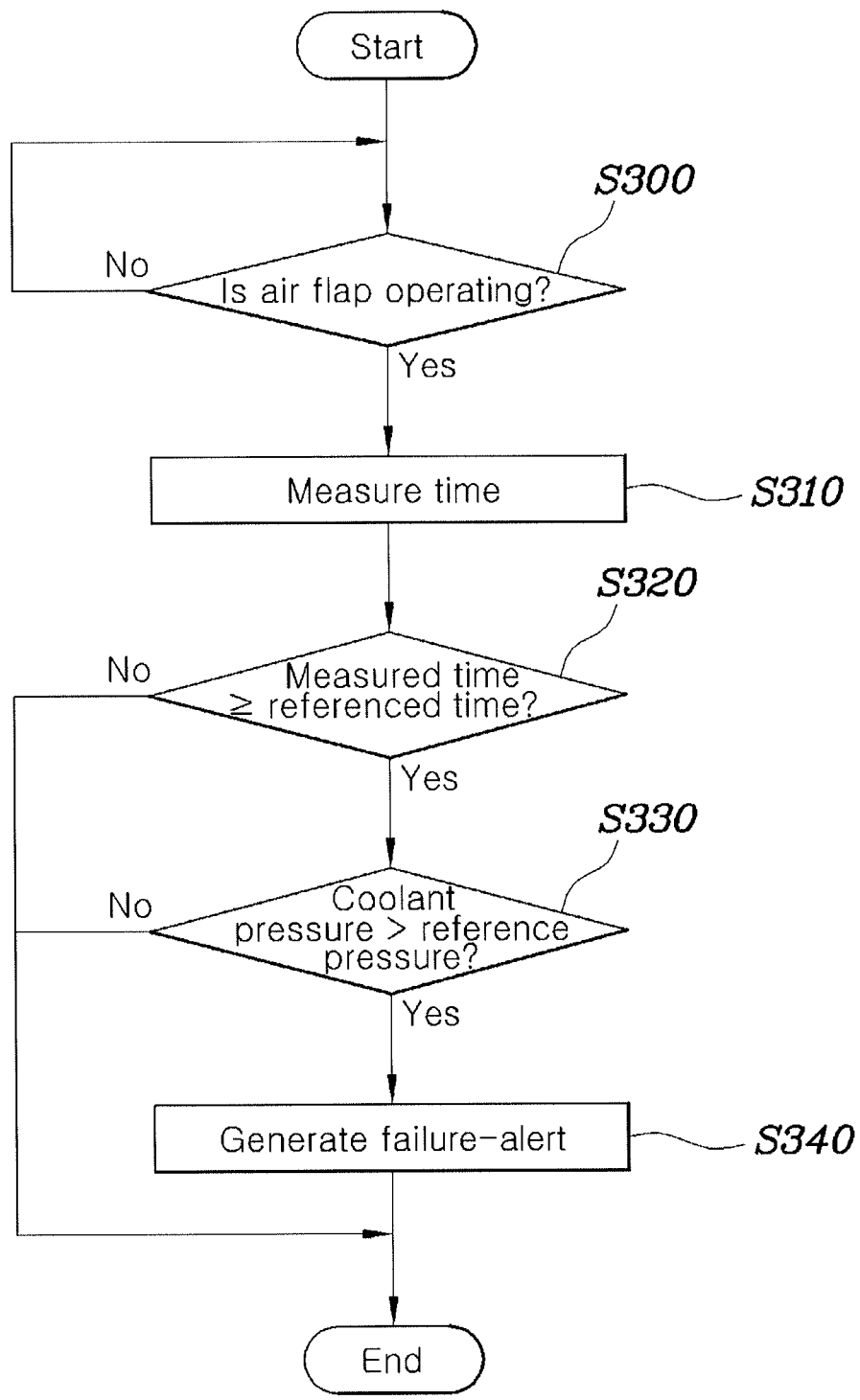

METHOD OF DETERMINING FAILURE OF ACTIVE AIR FLAP

CROSS-REFERENCE TO RELATED APPLICATIONS

The present application claims priority of Korean Patent Application Number 10-2011-0131859 filed Dec. 9, 2011, the entire contents of which application is incorporated herein for all purposes by this reference.

BACKGROUND OF INVENTION

1. Field of Invention

The present invention relates, in general, to a method of determining a failure of an active air flap (AAF) in which openable flaps are installed at the back of a radiator grill and bumper grill so as to control an inflow of air for cooling a vehicle engine.

2. Description of Related Art

Generally, an active air flap system is a system in which openable flaps are installed at the back of a radiator grill and bumper grill to control an inflow of air for cooling a vehicle engine. This system is operated such that it receives information of a vehicle (a temperature of cooling water, ON/OFF switch of an air conditioner, pressure of cooling medium) from an electrical control unit (ECU) via controller area network (CAN) communication so as to allow and block an inflow of external air according to the state of the vehicle, effecting an improvement of fuel efficiency through a reduction in air resistance, an improvement of heating performance through shortening the time for which a vehicle engine operates at a low temperature, a reduction of exhaust gas through rapid warming-up of an engine, and so forth.

However, such a newly employed system develops frequent problems, even becoming the cause of laying field claims. In other words, although an active air flap becomes defective on account of broken wires or a short-circuit, it may also temporarily malfunction because of simple freezing. In this case, the freezing may be naturally eliminated by the heat of the engine. However, if such a case is also determined that leads to a failure occurring in the system, a driver may feel uneasy about driving a vehicle, and reliability of the system is reduced.

Recently, some manufacturers have thus been willing to reduce the range of applications of the active air flap because of such problems.

Thus, as no definite factor now stands to distinguish between the freezing of the flap in wintertime and a failure of the air flap system, there is a problem of adaptation of the active air flap.

According to the conventional control logic to determine a failure of the active air flap, the freezing diagnosis is carried out simply using TAM temperature of ECU of the engine (the temperature of a temperature sensor installed in the side of the engine) to determine a condition of freezing. Here, if the flap is constrained below 15° C. of the TAM temperature, it is determined to be frozen.

However, this method has a problem in that the error range of temperature is excessive (±10° C.), effective condition on the TAM temperature exists, and the freezing is determined only using the TAM temperature, making it very difficult to precisely distinguish between the freezing and the failure.

Thus, there is a need to optimize the system to determine either the freezing or failure of the active air flap such that an engine-trouble lamp is not frequently turned on through frequent, unnecessary alert to a failure of an engine.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Various aspects of the present invention provide for a method of checking a failure of an active air flap in which logic of a system for controlling the active air flap is optimized such that, when a vehicle starts and stops to operate, and runs, alert by freezing does not occur, thereby minimising laying a field claim about the occurrence of a wrong vehicle-diagnosis.

The aimed method allows a driver to feel less uneasy about driving a vehicle, saves unnecessary A/S costs, and improves a field quality and brand image of a vehicle, contributing to securing the highest technical competitive power.

Various aspects of the present invention provide for a method of determining a failure of an active air flap, including: determining whether or not an active air flap is in a non-openable state; if the active air flap is in the non-openable state, continuously checking a variation of the temperature of engine-cooling water, and if the variation is below a reference variation, interrupting the generation of failure-alert; and if the variation of the temperature of engine-cooling water is above the reference variation, processing whether to generate the failure-alert such that if the time taken to reach the variation is above a reference temperature time, thus interrupting the generation of failure-alert, and if the time is below the reference temperature time, generating the failure-alert.

When the variation of the temperature of engine-cooling water is checked, the temperature of engine-cooling water and time to reach the temperature may be checked from the point when the active air flap has been determined to be in the non-openable state.

The determination that the variation is below the reference variation may be carried out by the comparison with a temperature data map on a normal variation of the temperature of engine-cooling water obtained according to the state of a vehicle being operated.

The reference variation and the reference temperature time may be drawn from the temperature data map on the normal variation of the temperature of engine-cooling water.

The method may include controlling, when the active air flap is in the open state, a voltage measured by a feedback sensor of the air flap to be below the open-state voltage range, and processing whether to generate the failure-alert such that if a difference between voltages before and after the control is below a reference voltage, interrupting the generation of failure-alert, and if the difference is above the reference voltage, generating the failure-alert.

The control-and-processing step may be carried out when the vehicle is started ON.

The step of processing the generation of failure-alert may include measuring the time taken while the air flap is operated to open or close, and processing the generation of failure-alert such that if the measured time is above a reference time, interrupting the generation of failure-alert.

The reference time may be drawn from a time data map composed of time taken while the air flap is opened and closed according to vehicle speed and battery status.

In the measuring-and-processing step, if the measured time is above the reference time, the failure-alert may be processed such that if the pressure of a coolant of an air conditioner is above a reference pressure, generating the failure-alert, and if the pressure is below the reference pressure, interrupting the generation of failure-alert.

The freezing and the failure may be distinguished taking account an increasing gradient (variation) of the temperature of engine-cooling water, a variation range of a feedback sensor, time to open and close the air flap, coolant pressure, etc. as well as TAM temperature, so that the precise, overall determination of the freezing is obtained using a variety of conditions, resulting in the operation of an engine alert-lamp being minimized and optimized.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIGS. 2, 3 and 4 are flow charts of an exemplary failure determination method according to the present invention.

DETAILED DESCRIPTION

Figure 1:
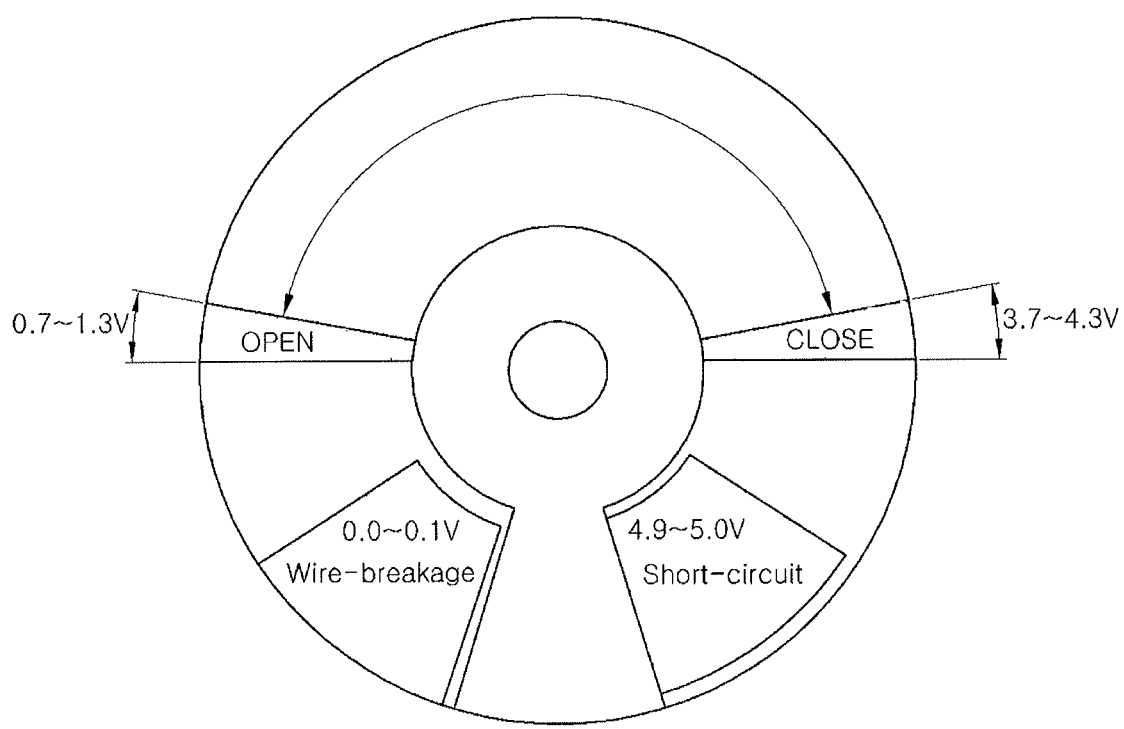
FIG. 1 is a view showing the sensing operation of a feedback sensor for implementing an exemplary method of determining a failure of an active air flap according to the present invention.

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Wherever possible, the same reference numerals will be used throughout the drawings and the description to refer to the same or like parts.

FIG. 1 is a reference view showing the sensing operation of a feedback sensor for implementing a method of determining a failure of an active air flap according to various embodiments of the present invention.

The active air flap includes a flap, an actuator which drives the flap, and a controller that controls the operation of the actuator and an alert lamp. A voltage-sensitive feedback sensor is installed to the actuator so as to detect the current status of the operation of the flap.

FIG. 1 shows the principle of the operation of the feedback sensor, wherein when the voltage range is 0.7~1.3V, the feedback sensor may indicate that the flap starts to open, and when the voltage range is 3.7~4.3V, the feedback sensor may indicate that the flap starts to close. When the voltage range is between the above two ranges, the feedback sensor may indicate that the flap is operating. When the voltage range is 0~0.1V or 4.9~5.0V, the feedback sensor may respectively indicate that wire-breakage or short-circuit occurs.

The voltage measured by the feedback sensor may also be used to determine whether or not the active air flap has failed. This will now be described.

FIGS. 2 to 4 are flow charts of a method of determining a failure of the active air flap. The method includes: determining whether or not an active air flap is in a non-openable state (S100); if the active air flap is in the non-openable state, continuously checking a variation of the temperature of engine-cooling water, and if the variation is below a reference variation, interrupting the generation of failure-alert (S120); and if the variation of the temperature of engine-cooling water is above the reference variation, processing whether to generate the failure-alert such that if the time taken to reach the variation is above a reference temperature time, interrupting the generation of failure-alert, and if the time is below the reference temperature time, generating the failure-alert (S130).

According to the failure determination method, if TAM temperature of an engine (the temperature of a temperature sensor installed in the side of the engine which is transferred to the ECU of the engine) decreases below a certain temperature, it is determined that the active air flap is not in a failed state, but in a frozen state. The determination of the freezing and failure may be carried out concurrently with the above and below control methods.

The method first includes determining whether or not the active air flap is in a non-openable state (S100). This step is performed using a voltage signal from the feedback sensor described before. Here, if the time for which voltage of the active air flap does not reach a desired voltage exceeds a certain period of time, the active air flap is first determined to be in the non-openable state. If the active air flap is in a non-closable state, it may be determined to be in an open state, which however is inefficient for fuel efficiency, but has no unstable factor to drive a power system such as an engine, so that the failure-alert may not be generated.

Then, if the active air flap is determined to be in the non-openable state, a variation of the temperature of engine-cooling water is continuously checked (S110). While the variation is below a reference variation, the generation of failure-alert is interrupted (S120). This is because the variation of the temperature of engine-cooling water being below the reference variation means the engine is not overheated, but is in a normal operation range, so that it need not yet generate the failure-alert. Thus, the failure-alert is not generated so long as even if the TAM temperature is below a certain level, the engine-cooling water is not overheated.

If the variation of the temperature of engine-cooling water is above the reference variation, whether to generate the failure-alert is processed such that if the time taken to reach the variation is above a reference temperature time, the generation of failure-alert is interrupted, and only if the time is below the reference temperature time, the failure-alert is generated (S130 and S140). This is because the variation of the temperature of engine-cooling water being below the reference temperature time, that is an increasing gradient of the variation being small, means the engine is not overheated, but is in a normal operation range, so that it need not yet generate the failure-alert.

Thus, such configuration distinguishes temporary malfunction due to freezing from a true failure, thereby preventing unnecessary generation of failure-alert.

In step S120, the temperature of engine-cooling water and time to reach the temperature are checked from a point when the air flap has been determined to be in the non-openable state. The determination of the variation is carried out by the comparison with a temperature data map on a normal variation of the temperature of engine-cooling water obtained according to the state of a vehicle being operated.

In steps S120 and S130, the reference variation and the reference temperature time may be drawn from the temperature data map on the normal variation of the temperature of engine-cooling water.

In other words, since the temperature of engine-cooling water properly varies according to the vehicle's operation state, such data are configured into the form of a map, so that gradients obtained by the variation and time to reach the variation are compared so as to distinguish the freezing from the failure.

Referring to FIG. 3, the method may further include step (S210), in which when the active air flap is in the open state, a voltage measured by the feedback sensor of the air flap is controlled to be below the open-state voltage range (S220), and the generation of the failure-alert is processed such that if a difference between voltages before and after the control is below a reference voltage, the generation of failure-alert is interrupted (S230), and if the difference is above the reference voltage, the failure-alert is generated (S240).

The control-and-processing step (S210) is carried out when the vehicle is started ON (S200). That is, this determines the normal operation of the air flap in the course of checking a vehicle at initial starting. In case of a vehicle, the air flap is controlled to be automatically maintained in an open state when the vehicle is in start-off mode, which is a measure against a failure.

When the vehicle is started ON again, it is determined whether the air flap is in the open state (S210). When the active air flap is in the open state, a voltage measured by the feedback sensor of the air flap is controlled to be below the open-state voltage range (below 0.7~1.3V of FIG. 1) (S220), and the generation of the failure-alert is processed such that if a difference between voltages before and after the control is below a reference voltage, the generation of failure-alert is interrupted (S230), and if the difference is above the reference voltage, the failure-alert is generated (S240).

That is, while the voltage being sensed to be similar to its original range even under intentional control is determined to be in the normal range so that the checking of the vehicle is terminated, if the voltage is sensed to be far from the original range, such a measurement is determined to be a wire-breakage or a failure, which causes the failure-alert to be generated.

Referring to FIG. 4, the step S130 may further include measuring the time taken when the air flap is operated to open or close, and processing the generation of failure-alert such that if the measured time is above a reference time, interrupting the generation of failure-alert (S300). In step S300, the reference time is drawn from a time data map composed of time taken when the air flap is opened and closed according to vehicle speed and battery status.

In step S300, if the time is above the reference time, the failure-alert is processed such that if the pressure of a coolant of an air conditioner is above a reference pressure, generating the failure-alert, and if the pressure is below the reference pressure, interrupting the generation of failure-alert.

That is, the time taken in the course of the air flap being opened or closed under the control of the controller is measured (S310), and if the measured time is above the reference time, the failure-alert is not yet generated (S320), and if the measured time is below the reference time, the failure-alert is generated only when the pressure of the coolant of the air conditioner is above the reference pressure (S330).

That is, when the coolant pressure is above the reference pressure, the situation is determined that the weather is not sufficient to freeze the air flap, so that although the air flap is operated slowly, the failure-alert is not generated. Further, when a compressor of the air conditioner is operated, it is very ready for the flap to defrost, the failure-alert is not first generated, but the situation is observed.

However, when the flap is operated slowly, and the air conditioner is not operated, the situation is determined that snow or the like accumulates over the air flap, generating the failure-alert to allow an operator to take a measure such as removing the accumulated snow.

Meanwhile, the reference time taken while the flap is operated may vary according to the battery status and the vehicle speed, so that the reference time is drawn from a time data map composed of time taken when the air flap is opened and closed according to vehicle speed and battery status.

The failure-determination obtained by the comparison of speeds during the operation shown in FIG. 4 may be carried out together with the failure-determination obtained by the comparison of the temperatures of engine-cooling water shown in FIG. 2.

In the meantime, the respective determination methods shown in FIGS. 2 to 4 may be simultaneously performed in a parallel manner. In addition, the limit provided for the comparison with the reference values, i.e. 'above', 'below' or the like, may vary if needed.

For convenience in explanation and accurate definition in the appended claims, the terms upper or lower, front or rear, inside or outside, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method of determining a failure of an active air flap, comprising:
    determining whether or not an active air flap is in a non-openable state;
    if the active air flap is in the non-openable state, continuously checking a variation of the temperature of engine-cooling water, and if the variation is below a reference variation, interrupting the generation of failure-alert; and
    if the variation of the temperature of engine-cooling water is above the reference variation, processing whether to generate the failure-alert such that if the time taken to reach the variation is above a reference temperature time, interrupting the generation of failure-alert, and if the time is below the reference temperature time, generating the failure-alert.

2. The method according to claim 1, wherein when the variation of the temperature of engine-cooling water is checked, the temperature of engine-cooling water and time to reach the temperature are checked from the point when the active air flap has been determined to be in the non-openable state.

3. The method according to claim 1, wherein the determination of the variation being below the reference variation is carried out by the comparison with a temperature data map on a normal variation of the temperature of engine-cooling water obtained according to a state in which a vehicle is being operated.

4. The method according to claim 1, wherein the reference variation and the reference temperature time are drawn from the temperature data map on the normal variation of the temperature of engine-cooling water.

5. The method according to claim 1, further comprising controlling, when the active air flap is in an open state, a voltage measured by a feedback sensor of the air flap to be below the open-state voltage range, and processing whether to generate the failure-alert such that if a difference between voltages before and after the control is below a reference voltage, interrupting the generation of failure-alert, and if the difference is above the reference voltage, generating the failure-alert.

6. The method according to claim 5, wherein the control-and-processing step is carried out when the vehicle is started ON.

7. The method according to claim 1, wherein the step of processing the generation of failure-alert further includes measuring the time taken while the air flap is operated to open or close, and processing the generation of failure-alert such that if the measured time is above a reference time, interrupting the generation of failure-alert.

8. The method according to claim 7, wherein the reference time is drawn from a time data map composed of time taken while the air flap is opened and closed according to vehicle speed and battery status.

9. The method according to claim 7, wherein in the measuring-and-processing step, if the measured time is above the reference time, the failure-alert is processed such that if the pressure of a coolant of an air conditioner is above a reference pressure, generating the failure-alert, and if the pressure is below the reference pressure, interrupting the generation of failure-alert.

* * * * *